Patented Aug. 19, 1924.

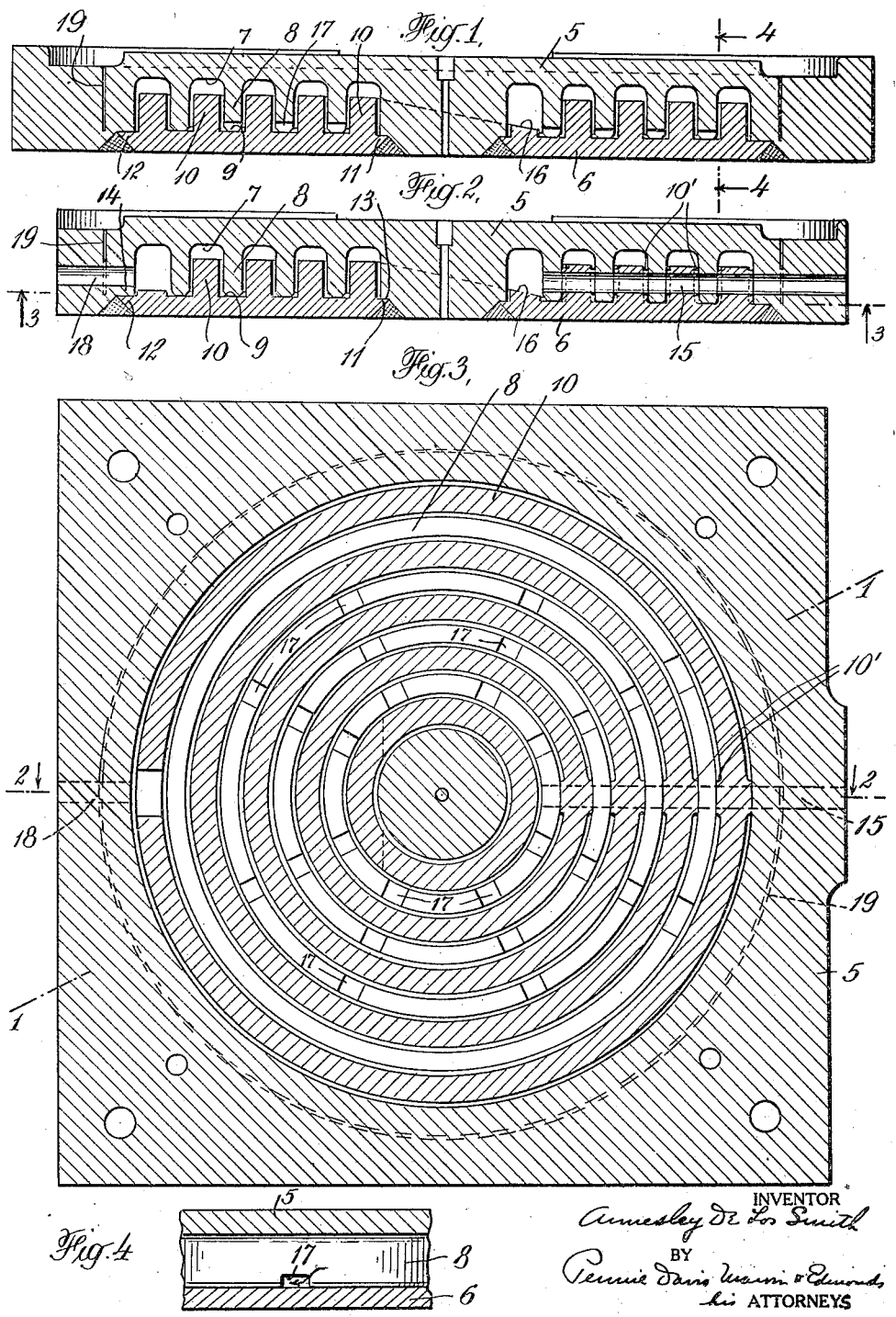

1,505,671

UNITED STATES PATENT OFFICE.

ANNESLEY DE LOS SMITH, OF MOUNT VERNON, NEW YORK.

METHOD OF HEATING AND COOLING PLASTIC MATERIAL AND APPARATUS THEREFOR.

Application filed February 20, 1924. Serial No. 694,171.

*To all whom it may concern:*

Be it known that I, ANNESLEY DELOS SMITH, a citizen of the United States, residing at Mount Vernon, in the county of Westchester, State of New York, have invented certain new and useful Improvements in Methods of Heating and Cooling Plastic Material and Apparatus Therefor; and I do hereby declare the following to be a full, clear, and exact description of the invention, such as will enable others skilled in the art to which it appertains, to make and use the same.

This invention relates to a method of and apparatus for heating and cooling plastic material in molding presses and is particularly adapted for the manufacture of sound-reproducing records. It may be utilized also wherever it is desirable to alternately and rapidly heat and cool materials of a plastic or semi-plastic nature.

In the manufacture of sound-reproducing records dies are mounted in a suitable press upon supporting plates which are provided with passages for steam and cold water. The dies are thus heated by the steam and the mass of plastic dough is placed between them. Pressure is then applied to form the record and cold water is admitted to the passages to chill the material. As the press opens steam is again admitted to heat the dies in preparation for the next operation. The successive heating and chilling of the dies is conducted as rapidly as possible in maintaining maximum production. Consequently the metal of the plates is subjected to severe stresses.

A more serious difficulty than the destructive effect of alternate heating and cooling is that of obtaining uniformity of heating and cooling. Numerous attempts have been made to secure uniformity of heat distribution by the arrangement of the passages in the die-supporting plates but equalization of the temperatures at various parts of the die-supporting plates has never been accomplished heretofore.

It is the object of the present invention to provide a method of and apparatus for heating and cooling dies and the like which permits substantial equalization of the temperatures at all parts of the die in a rapid and effective manner and which reduces the stresses to which the die-supporting plate is subjected in the alternate application of heating and cooling media.

Another object of the invention is to provide for expansion and contraction of the heated and cooled portion of the plate independently of the surrounding portion thereof.

To secure equalization of temperature the heating and cooling media are conducted to the central area of the surface to be treated, but instead of traveling thence outwardly in paths which are annular as in plates heretofore used the path of travel of the media is, according to my invention, substantially radial or from the center to the circumference. Moreover, to ensure uniform heating I prefer to cause the media to travel successively in transverse directions within the plate from the face to the back thereof. In the heating and cooling operations, therefore, the respective medium moves in all directions from the center of the plate toward the periphery and at the same time it is directed repeatedly toward the face and back of the plate. As the medium successively fills the passages within the plate, its travel is not extended, as in the case of annular or spiral passages, so that a marked difference in temperature exists between the opposite ends of the passage.

It can be demonstrated readily that the distribution of the heating and cooling media as described is more rapid and efficient than has been possible with any other arrangement of distributing passages because the heating and cooling surfaces are increased and the amounts of heating and cooling media required to accomplish the purpose of the invention are reduced. Moreover, the face and back of the plate are quickly brought to a uniform temperature and dangerous stresses are thereby avoided. The rapid distribution of the heating and cooling media ensures substantial equalization of the temperature at all parts of the surface which is in contact with the die. This is a very material advantage since it ensures uniformly plastic material and consequently it permits the most rapid and successful production of sound-reproducing records and similar objects.

It is to be understood that while dies for sound-reproducing records are generally circular, the terms radial and annular as used herein are not intended to limit the invention to circular heating and cooling plates. By a simple adaptation and rearrangement of the passages it may be applied with like advantages to rectangular plates.

The die-supporting plates which are used in the manufacture of sound-reproducing records are generally rectangular in form and include a substantial amount of metal in excess of that portion of the plate which is heated and cooled. The inner and outer portions of the plate do not expand and contract to the same extent and consequently stresses are set up in the metal which tend to rupture the plate after more or less extended use. To avoid this difficulty I provide a narrow channel in the face of the plate surrounding the inner portion of the plate but not extending through to the back thereof. This channel can be formed by a milling cutter or otherwise or the central portion of the plate can be made as a separate part and welded to the outer portion, leaving a channel as described. The narrow channel permits the inner portion of the plate to expand independently of the outer portion and avoids the stresses mentioned.

In carrying out the invention in its preferred embodiment a supporting plate is provided for each die. Each plate comprises, preferably, two parts which are welded together to form a unitary structure. The parts of the plates are provided with interfitting ribs and channels which form the baffled passages through which the heating and cooling media travel from the inlet to the outlet. The inlet is arranged to carry the media to the central region of the plate where a channel is formed with a sloping bottom which directs the media gradually toward the face of the plate to avoid causing a hot or cold spot thereon. As soon as the heating or cooling medium fills the central channel it travels transversely about the adjacent rib on the face portion of the plate toward the rear thereof and thence through a plurality of radial openings provided in the rib into a surrounding channel. The second channel is quickly filled with the medium which then travels about the next rib and through radial openings as before until the outer channel is filled. The openings to the outer channel are disposed only at the inlet side of the plate to avoid the discharge of the heating or cooling media before it has heated or cooled the outer zone of the plate. The medium escapes from the outer channel through the outlet. The radial openings between the successive channels may be in alignment or staggered, the latter arrangement being perhaps advantageous.

The distribution of the heating or cooling medium through the plate is almost instantaneous as it enters under pressure and the passages are designed to permit rapid travel from the central to the outermost channel. Owing to the large amount of metal surface which is exposed to the media in the plate heating and cooling are both rapid and uniform.

To permit relative expansion and contraction of the inner and outer portions of the plate I provide a slot which is preferably milled or otherwise formed in the face of the plate. The slot is very narrow and is covered by the clamping ring which holds the die in place on the face of the plate. If the slot is cut in the plate it need not cross the inlet and outlet passages and consequently no leakage can occur if the pipes through which the media are introduced and withdrawn communicate merely with the outer ends of these passages. The central portion of the face of the plate may, however, be made as a separate part and welded to the outer support at the back. In that case the slot is not cut but is formed by making the face portion of the plate somewhat smaller in diameter than the inner diameter of the outer support. The inlet and outlet passages are then reamed and the pipes conveying the heating and cooling media are threadedly or otherwise connected to the extensions of these passages in the central portion, thus avoiding leakage.

The invention will be further described with reference particularly to plates for manufacturing sound-reproducing records as illustrated in the accompanying drawing, in which Fig. 1 is a section on the line 1—1 of Fig. 3;

Fig. 2 is a section on the line 2—2 of Fig. 3;

Fig. 3 is a section on the line 3—3 of Fig. 2; and

Fig. 4 is a detail in section.

Figure 5:
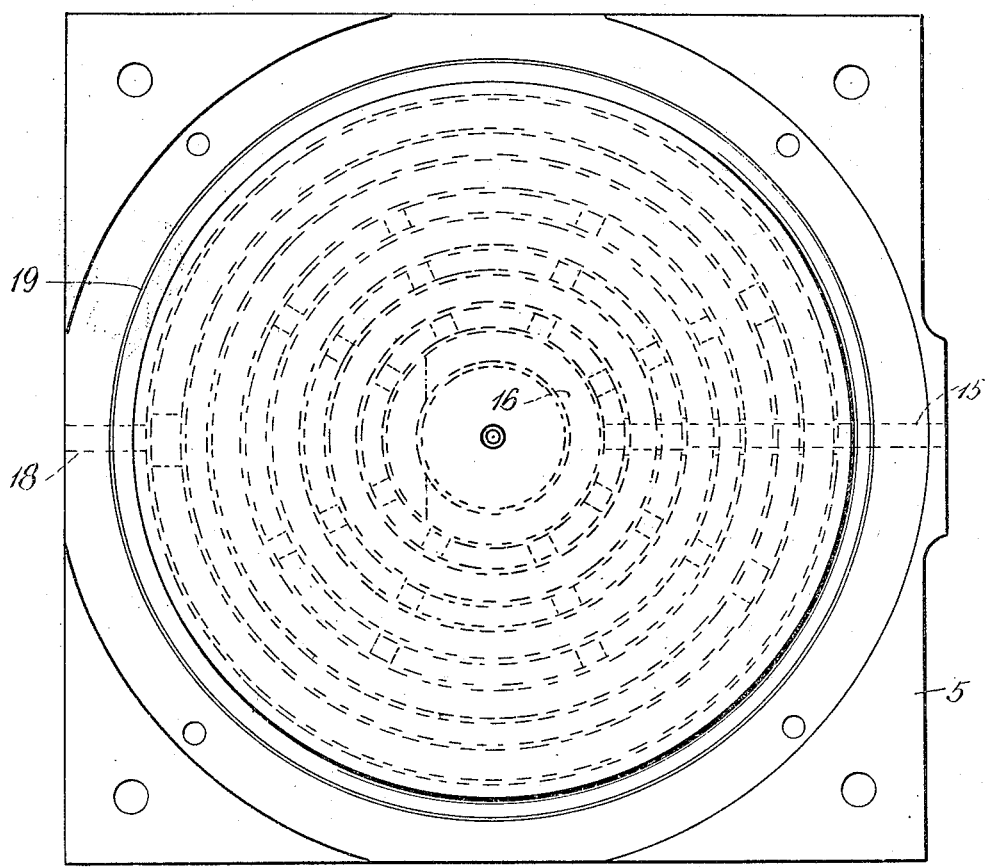
Figure 5 is a plan view of the face portion of the plate.
Figure 6:
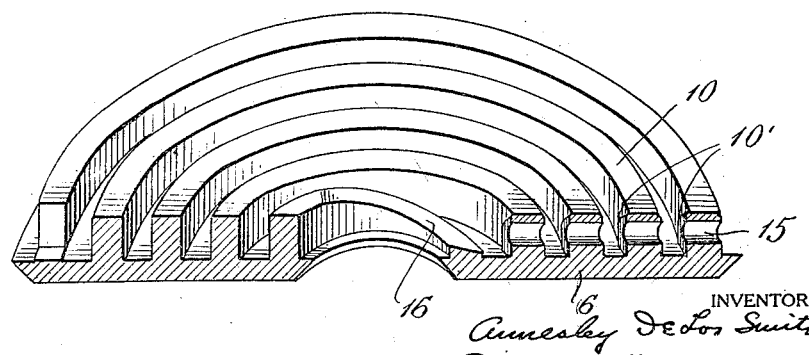
Figure 6 is a section in perspective of the back portion of the plate.

Referring to the drawing, 5 indicates the face and 6 the back of a heating and cooling plate which is made in two parts of steel or other suitable metal capable of withstanding the stresses due to heating and cooling and the relatively enormous pressures which are used in forming plastic materials. The face portion 5 of the plate is provided with a plurality of annular channels or grooves 7 and corresponding ribs 8. The ribs increase the strength of the plate and the heat-interchanging surface. The back portion 6 is provided with complementary channels 9 and ribs 10, and it will be noted that the surfaces of the cooperating ribs and channels are not in contact except where the ends of the ribs 8 seat at the bottoms of the channels 9 and at the inlet passage where bosses 10' are provided in the ribs 10 to prevent escape of the heating and cooling media. The back portion 6 of the plate is flanged at 11 and 12 and the flanges rest against shoulders 13 and 14 on the face portion of the plate. The adjacent surfaces are cut to form grooves which are filled in welding the portions of the plate. The welding is preferably accomplished with an oxyacetylene torch or by the electric arc and the parts of the plate are joined by melting the adjacent surfaces and a welding rod to form a unitary structure. The flanges 11 and 12 prevent any molten material from entering the channels of the plate.

A passage 15 which extends through all of the ribs on the face and back portions of the plate conducts the heating and cooling media to the central channel. The rib on the back portion of the plate which projects into this channel is made with a sloping face 16 which directs the media gradually toward the face of the plate so that the heating or cooling may not be too abrupt at the start.

The ribs 8 on the face portion of the plate seat in the bottoms of the grooves 9 of the back portion of the plate and prevent communication between the grooves except through openings 17 which are provided at intervals in the ribs. These openings may be opposite each other or may be staggered. In the outermost rib 8 only two openings 17 are provided so that all of the heating and cooling media are delivered to the outermost channel on the inlet side of the plate.

When steam or cold water is admitted to the central channel it passes about the ribs into the next channel and thence through the channels successively in all directions from the central to the next to the outermost channel. It then escapes to the latter channel and through an outlet 18. Rapid heating and cooling of the plates are thus assured.

A slot 19 is shown in the face of the plate and extending to a substantial depth therein. The slot is not cut through the inlet and outlet passages 15 and 18 in this form of the invention. It is of sufficient width to permit expansion of the inner portion of the plate without subjecting the outer portion to stress and consequently prolongs the life of the plate. As hereinbefore indicated, the slot can be formed otherwise than as shown.

Various changes can be made in the details of construction of the plate without departing from the invention or sacrificing any of the advantages thereof.

I claim:—

1. The method of uniformly heating and cooling plastic materials in molding under pressure, which comprises introducing the heating and cooling media at the central region of the area to be treated and permitting the media to expand in substantially radial directions therefrom.

2. The method of uniformly heating and cooling plastic materials in molding under pressure, which comprises introducing the heating and cooling media at the central region of the area to be treated and permitting the media to expand in substantially radial directions therefrom, the media being also caused to travel alternately away from and toward the material.

3. The method of uniformly heating and cooling plastic material in molding under pressure, which comprises introducing the heating and cooling media at the central region of the area to be treated, directing the media alternately away from and toward the material and permitting it to expand in substantially radial directions to the surrounding regions of the area.

4. A heating and cooling plate to support a die in molding plastic material comprising complementary parts having alternating ribs and channels communicating in radial directions and a passage to deliver the heating and cooling media to the central channel.

5. A heating and cooling plate to support a die in molding plastic material comprising complementary parts having alternating ribs and channels with openings in the ribs on one of the parts to provide communication between the channels in radial directions and a passage to deliver the heating and cooling media to the central channel.

6. A heating and cooling plate to support a die in molding plastic material comprising complementary parts having alternating ribs and channels, the ribs on one of the parts seating in the bottoms of the channels on the other part and having openings to provide communication between the channels in radial directions, the plate having a passage to deliver the heating and cooling media to the central channel.

7. A heating and cooling plate to support a die in molding plastic material comprising complementary parts having alternating ribs and channels and a passage to deliver the heating and cooling media to the central channel, the rib projecting to said channel having a sloping surface to divert the media toward the opposite part and the remaining ribs being formed to permit communication between the channels in radial directions.

8. A heating and cooling plate to support a die in molding plastic material comprising complementary parts having alternating ribs and channels and a passage to deliver the heating and cooling media to the central channel, the surfaces of the ribs and channels being spaced to permit travel of the media transversely of the plate and the ribs being formed to permit communication between the channels in radial directions.

9. A heating and cooling plate to support a die in molding plastic material comprising inner and outer portions, the former having means permitting the distribution of heating and cooling media therethrough, said plate having a slot to permit expansion of the inner portion relatively to the outer portion.

10. A heating and cooling plate to support a die in molding plastic material comprising inner and outer portions, the former having means permitting distribution of heating and cooling media therethrough, the outer portion being spaced from the inner portion at the face of the plate to permit independent expansion of the inner portion.

In testimony whereof I affix my signature.

ANNESLEY DeLOS SMITH.